United States Patent [19]

Porter et al.

[11] Patent Number: 5,056,613

[45] Date of Patent: Oct. 15, 1991

[54] VEHICULAR SPEED CONTROL SYSTEM WITH REDUCED GEAR CHATTER

[75] Inventors: David L. Porter, Westland; Charles F. Weber, South Lyon; Kah S. Oo, Farmington Hills, all of Mich.

[73] Assignee: Ford Motor Company, Dearborn, Mich.

[21] Appl. No.: 558,918

[22] Filed: Jul. 27, 1990

[51] Int. Cl.⁵ ............................................. F16H 55/24
[52] U.S. Cl. ..................................... 180/178; 74/440; 123/361
[58] Field of Search ................. 74/857, 402, 403, 409, 74/440, 443; 180/178; 123/361

[56] References Cited

U.S. PATENT DOCUMENTS

| | | | |
|---|---|---|---|
| 1,334,517 | 3/1920 | Bryan . | |
| 1,558,222 | 10/1925 | Beetow . | |
| 3,229,546 | 1/1966 | Nallinger et al. | 74/857 |
| 3,359,819 | 12/1967 | Veillette et al. . | |
| 4,640,147 | 2/1987 | Yasukawa et al. | 74/409 |
| 4,688,441 | 8/1987 | Yasukawa et al. | 74/409 |
| 4,739,670 | 4/1988 | Tomita et al. | 74/440 X |
| 4,745,823 | 5/1988 | Morita et al. | 74/409 |
| 4,781,073 | 11/1988 | Bondhus et al. | 74/409 X |

FOREIGN PATENT DOCUMENTS 1161526  1/1984  Canada ................................ 74/857

*Primary Examiner*—Allan D. Herrmann
*Assistant Examiner*—William O. Trousdell
*Attorney, Agent, or Firm*—Allan J. Lippa; Peter Abolins

[57] ABSTRACT

A vehicle speed control system having phasing circuitry which provides a sequence of electrical phase steps in response to a comparison of actual vehicle speed to a desired vehicle speed. A stepper motor coupled to a pinion shaft rotates by discrete phase steps in response to the phasing circuitry. An anti-backlash/-transfer gear assembly includes a first sprocket gear coupled to a second sprocket gear by integrally formed compression or flexure members which hold the sprocket gears together and a spring assembly which displaces the circumferential teeth of the two sprocket gears relative to one another. Another gear assembly couples rotational movement from the stepper motor to the engine throttle.

15 Claims, 5 Drawing Sheets

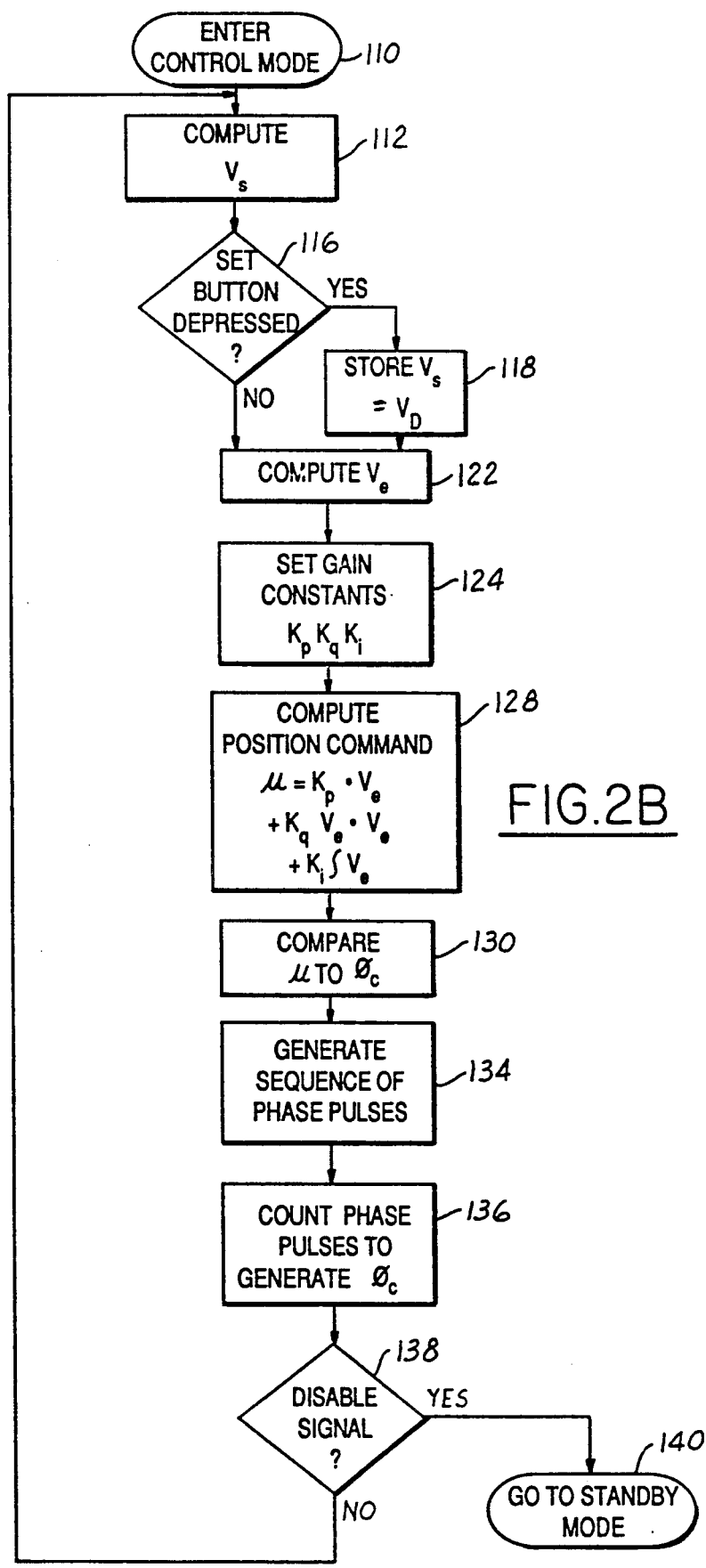

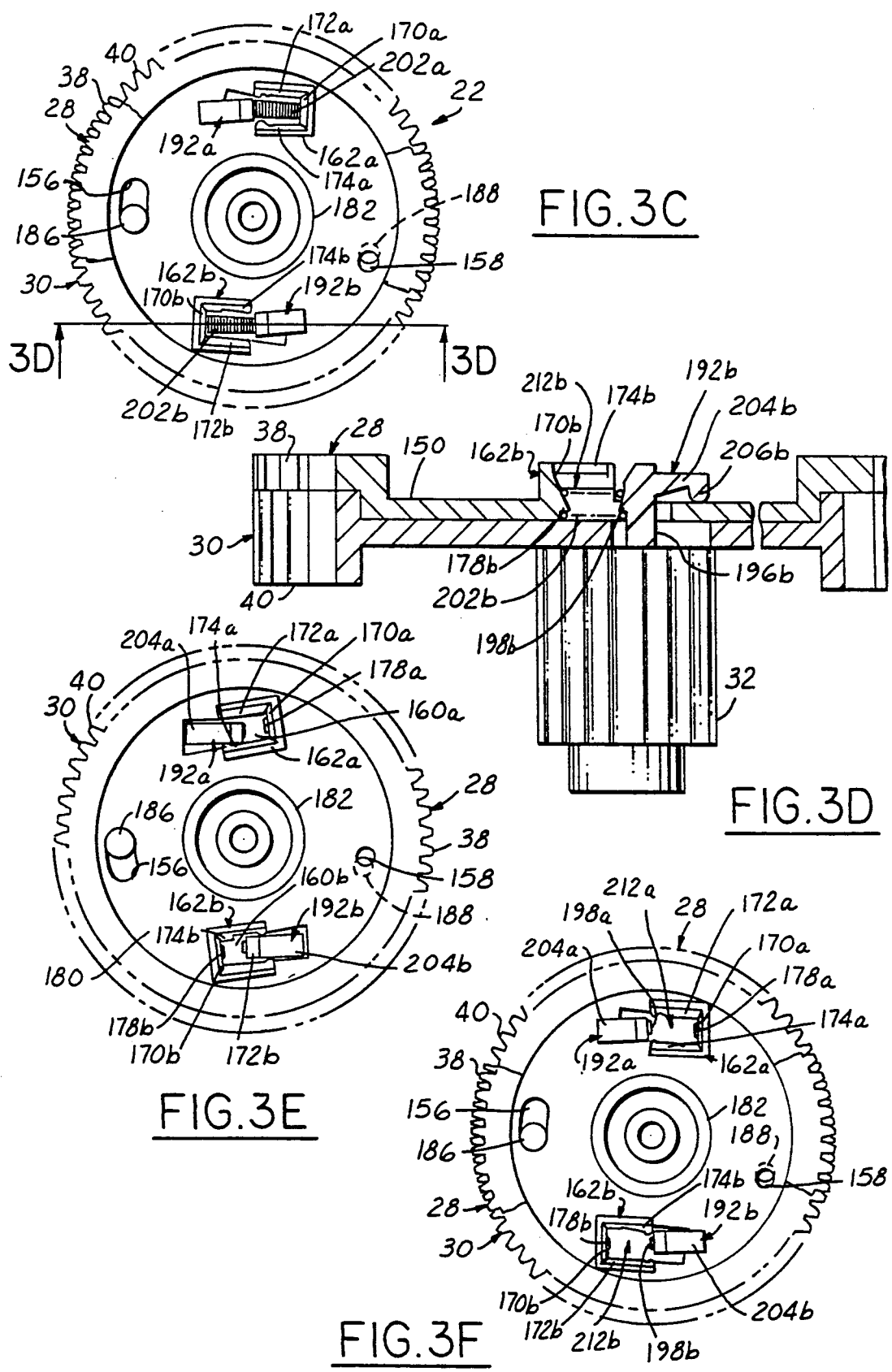

VEHICULAR SPEED CONTROL SYSTEM WITH REDUCED GEAR CHATTER

BACKGROUND OF THE INVENTION

The field of the invention relates to a vehicular speed control system having reduced audible gear chatter.

A typical speed control system includes a DC motor coupled to an engine throttle by mechanical transfer gears. The DC motor is usually responsive to a feedback loop which compares actual vehicle speed with a set or desired speed to generate an error signal. Accordingly, the engine throttle is rotated by the DC motor in a direction to reduce the error signal. Since the inertia load (transfer gears, throttle linkage, and throttle) does not abruptly change, and the DC motor rotates at substantially constant velocity, gear chatter has not been a problem with these systems. Stated another way, backlash between mating transfer gears has not been recognized as a problem with conventional speed control systems.

The inventors herein have recognized, and appear to be the first to have recognized, that gear backlash may be a problem when certain stepper motors are employed in speed control systems. More specifically, when the stepper motor rotates in discrete phase steps, the resulting nonconstant angular velocity may result in a transfer gear backlash. This backlash may result in audible gear chatter which the vehicular operator may find disturbing. The inventors herein have also recognized that anti-backlash gears may be utilized to advantage in a speed control system employing a stepper motor which rotates at nonconstant angular velocity. However, the inventors herein believe that conventional anti-backlash gears are not suited for assembly in a mass production environment. More specifically, prior anti-backlash gears required complicated assembly of springs, pins, split gears, and retaining rings which require considerable manual dexterity and therefore results in time consuming assembly operations.

SUMMARY OF THE INVENTION

An object of the invention herein is to provide a speed control system utilizing a stepper motor controlled to move in discrete phase steps and is coupled to a new anti-backlash gear to avoid audible gear chatter. Another object of the invention is to provide a new anti-backlash gear which is substantially less complicated and easier to assemble than heretofore possible.

The above objects are achieved, and disadvantages of prior approaches solved, by providing a vehicular speed control system coupled to an engine throttle having reduced gear chatter. In one particular aspect of the invention, the speed control system comprises: phasing means for providing a sequence of electrical phase steps in response to a comparison of actual vehicle speed to a desired vehicle speed; a stepper motor coupled to a pinion shaft for rotating the pinion shaft by discrete phase steps in response to the phasing means; first gear transfer means having a plurality of gear teeth for rotatably coupling to the pinion shaft with minimal slack between the gear teeth of the first gear transfer means and gear teeth of the pinion shaft; and second gear transfer means coupled between the first gear transfer means and the throttle for displacing the throttle in response to rotational movement of the stepper motor.

The above aspect of the invention provides an advantage of a speed control system employing a stepper motor which, although it rotates at nonconstant angular velocity, is substantially immune from audible gear chatter.

In another aspect of the invention, the speed control system comprises: generating means for generating a speed error signal by comparing actual vehicle speed to a set speed; phasing means for providing a sequence of electrical phase steps in response to the speed error generating means; a stepper motor coupled to a pinion shaft for rotating the pinion shaft by discrete phase steps in response to the phasing means; first gear transfer means having a plurality of gear teeth for rotatably coupling to the pinion shaft with minimal slack between the gear teeth of the first gear transfer means and gear teeth of the pinion shaft, the gear transfer means comprising a first sprocket gear coupled to a second sprocket gear in compression by a flexible member integrally formed on the first sprocket gear and extending through an opening in the second sprocket gear to apply compression to an outer face of the second sprocket gear, guide means integrally formed on the outer face of the second sprocket gear for alignment with the flexible member, and spring means inserted between the flexible member and the guide means on the outer face of the second sprocket gear for displacing the first sprocket gear relative to the second sprocket gear; and second gear transfer means coupled between the first gear transfer means and the throttle for displacing the throttle in response to rotational movement of the stepper motor.

The above aspect of the invention provides an advantage of substantially eliminating audible gear chatter in a speed control system employing a stepper motor. Another advantage of the above aspect of the invention, is that simple assembly is provided by inserting the second sprocket gear over the first sprocket gear such that it is interlocked by the above described flexible member. Further, the spring may be simply inserted on the outer face of the second sprocket gear between the flexible member and guide. This results in a substantially foolproof assembly process requiring no tools and very few, simple assembly steps.

BRIEF DESCRIPTION OF THE DRAWINGS

The objects and advantages described herein will be better understood by reading an example of an embodiment, referred to as the preferred embodiment, described below with reference to the drawings wherein:

FIG. 2B is a flowchart of various computational steps performed by the circuitry shown in FIG. 2A;

FIG. 3C is a top view of the transfer/backlash gear;

FIG. 3D shows a partial perspective view taken along line 3D—3D shown in FIG. 3C;

FIGS. 3E-3G illustrate the assembly process for assembling the transfer/backlash gear.

DESCRIPTION OF THE PREFERRED EMBODIMENT

Figure 1:
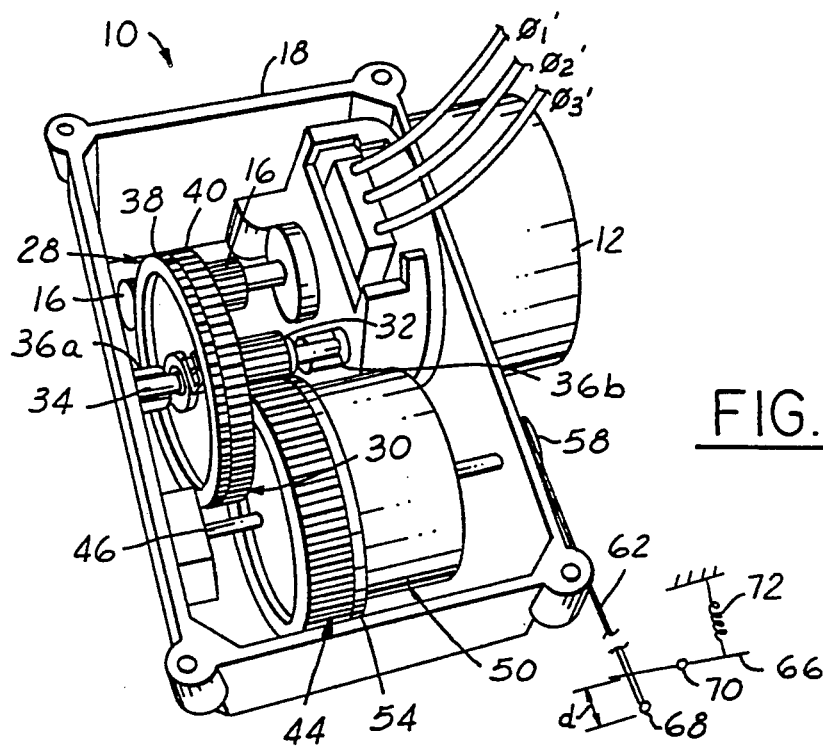
FIG. 1 is a perspective view of a speed control system in which the invention is used to advantage.
Figure 2A:
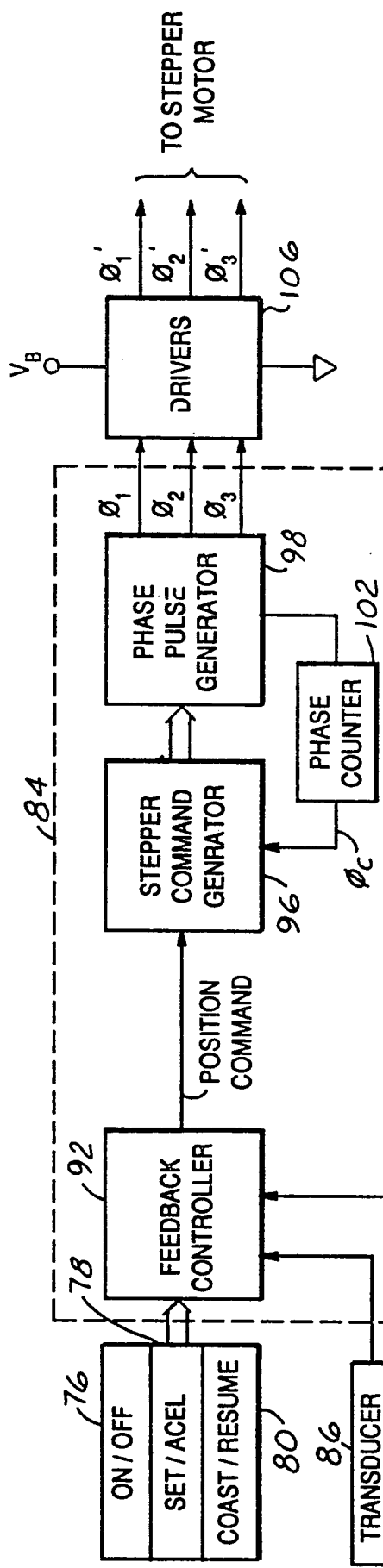
FIG. 2A is an electrical block diagram of the control circuitry for controlling the speed control system shown in FIG. 1.

Referring first to FIG. 1, vehicular speed control system 10 is shown including stepper motor 12, a three phase stepper motor in this example, positioned partially through housing 18 and coupled to pinion shaft 16. Stepper motor 12 is responsive to electrical phase signals $\Phi_1'$, $\Phi_2'$, and $\Phi_3'$, from control circuitry which is described in greater detail later herein with particular reference to FIGS. 2A–2C. Also described in greater detail later herein with particular reference to FIGS. 3A–3G, transfer/backlash gear 22 includes sprocket gear 28, sprocket gear 30, and pinion gear 32 mounted on shaft 34. Sprocket gear 28 and sprocket gear 30 form a split-gear pair having respective circumferential gear teeth 38 and circumferential gear teeth 40 displaced from one another for mating to pinion shaft 16 with minimal or zero slack.

Pinion gear 32 is shown rotatably coupled to transfer gear 44 which is rotatably coupled to shaft 46. Rotatable core 50 is fixedly connected to shaft 46 and electromagnetically coupled and uncoupled to transfer gear 44 via clutch plates 54. Electrical coils (not shown) within core 50 engage clutch plates 54 when speed control system 10 is activated, such as by an operating actuable button, and disengage clutch plates 54 when speed control 10 is deactuated such as when the vehicular brakes are applied or the off switch depressed.

Cable connector 58 is shown fixedly coupled to shaft 46 for displacing throttle cable 62 and, accordingly, throttle plate 66 after cable slack "d" between throttle end 68 and throttle plate 66 is taken in. In operation, rotational movement of stepper motor 12 displaces throttle plate 66 by coupling rotational movement through pinion gear 16, transfer/backlash gear 22, transfer gear 44, rotatable core 50, shaft 46 and cable connector 58.

Referring now to FIG. 2, a block diagram of the control circuitry for speed control system 10 is described. Speed control commands are provided by conventional steering wheel mounted switches designated as ON/OFF switch 76, SET/ACCELERATE switch 78, and COAST/RESUME switch 80, each of which provides corresponding electrical commands to microprocessor 84. Transducer 86 provides microprocessor 84 with speed signal $V_s$ corresponding to actual vehicle speed. Brake switch 90 provides an indication to microprocessor 84 when the vehicular brakes are activated.

Figure 2C:
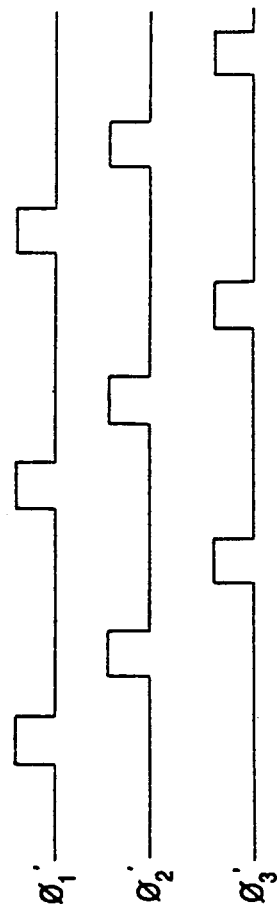
FIG. 2C illustrates various electrical waveforms generated by the circuitry shown in FIG. 2A.

Microprocessor 84, a conventional microprocessor such as sold by Motorola is represented in FIG. 2 by functional blocks designated in general terms as feedback controller 92, stepper command generator 96, phase pulse generator 98, and phase counter 102. As described later herein with particular reference to FIG. 2B, feedback controller 92 generates a position command by comparing actual vehicle speed ($V_s$) to a desired speed ($V_D$). Phase pulse generator 98 generates a sequence of phase pulses $\Phi_1$, $\Phi_2$, and $\Phi_3$ for the three phases of stepper motor 12. Phase counter 102 counts each phase to generate phase count $\Phi_C$ which is an inference of the actual position of stepper motor 12. Stepper command generator 96 compares the desired position command from feedback controller 92 with $\Phi_C$ to provide an updated position command to phase pulse generator 98. The resulting sequence of phase signals $\Phi_1$, $\Phi_2$, and $\Phi_3$, are converted into the appropriate phase drive signals $\Phi_1'$, $\Phi_2'$, and $\Phi_3'$ by conventional drivers 106, transistor switches in this example. A sequence of phase drive signals $\Phi_1'$, $\Phi_2'$, and $\Phi_3'$ for a desired motor velocity is shown in FIG. 2C. Each phase represents power applied to the appropriate stator coil (not shown) of stepper motor 12 for turning its rotor by a predetermined phase increment.

Referring now to FIG. 2B, a flowchart of various computational steps performed by microprocessor 84 during the control mode (i.e., steady state speed control) is shown. Although a microprocessor and associated processing steps are described herein, those skilled in the art will recognize that these steps may be performed by other means such as discrete IC's or corresponding analog devices. Vehicle speed is calculated (step 112) as described in U.S. patent application Ser. No. 280,907, the specification of which is incorporated herein by reference. If the set switch has been depressed by the operator since the last microprocessor background loop (see step 116) the actual vehicle speed is stored in memory as the set or desired speed $V_D$ during step 118. Speed error signal $V_e$ is then computed during step 122 by subtracting desired speed $V_D$ from actual speed $V_S$. Proportional gain constant $K_p$, quadratic gain constant $K_q$, and integral gain constant $K_i$ are determined during step 124. Position command u, correlated to desired throttle position, is then computed during step 128 in accordance with the following equation:

$$u = K_p*V_e + K_q*V_e*V_e + K_i\int V_e$$

During step 130, position command u is compared to phase count $\Phi_C$ to determine the phase correction required to bring stepper motor 12 to a desired phase position. In response, the required sequence of phase pulses is generated during step 134. An example of such a sequence is shown in FIG. 2C as previously described herein. Each phase pulse generated is counted to generate phase count $\Phi_C$ (step 136) which provides an indication of actual position of stepper motor 12 and, accordingly, throttle 66. During step 138, microprocessor 84 determines whether a disable signal has been received such as when the vehicular brakes are applied or an OFF signal has been received. If a disable signal has not been received, the above described process steps are repeated during the next microprocessor background loop. Otherwise, speed control system 10 enters the standby mode (step 140) in which speed control is deactivated until receipt of a SET or, if appropriate, a RESUME signal.

Figure 3A:
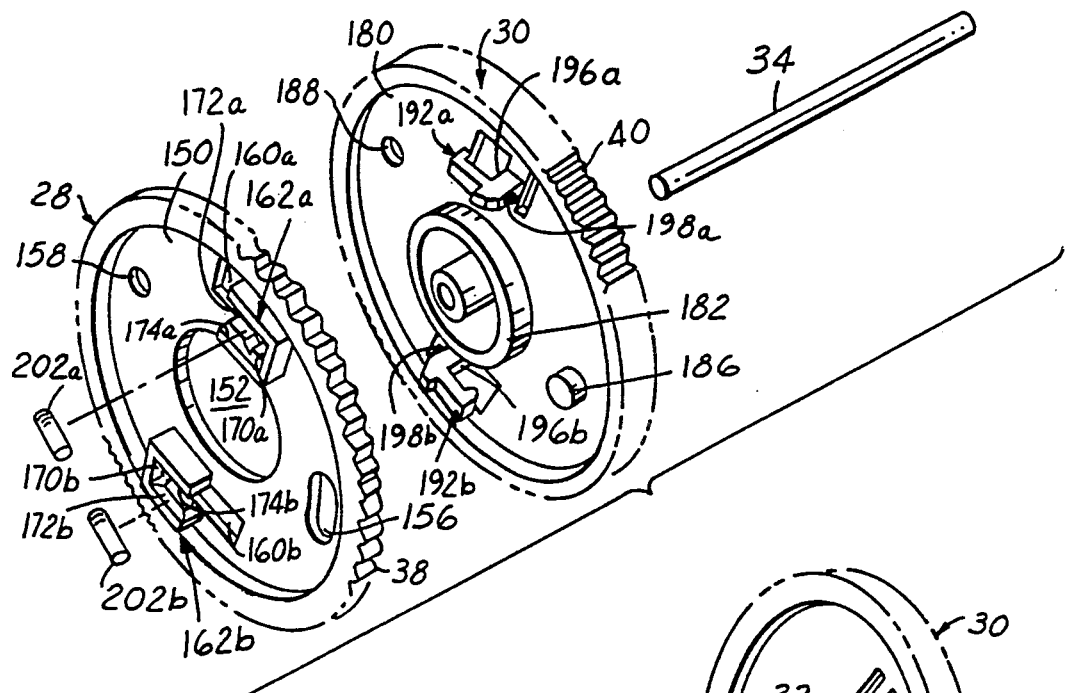
FIG. 3A is an exploded view of a transfer/backlash gear utilized in the embodiment shown in FIG. 1.

Transfer/backlash gear 22 is now described in more detail with particular reference to FIGS. 3A–3G. Referring first to FIG. 3A, upper sprocket gear 28 is shown having circumferential teeth 38. Sprocket gear 28 is also shown having upper face 150 recessed therein which includes axial opening 152, guide slot 156, assembly alignment opening 158, spring guide slot 160a and spring guide slot 160b. Spring guide 162a is shown as a three sided guide outwardly extending from upper face 150 and partially surrounding spring guide slot 160a. Spring guide 162a is also shown having three downward sloping shoulders 170a, 172a, and 174a formed on each of its three sides. Shoulder 170a is shown having tab 178a extending therefrom. Similarly, spring guide 162b is a three sided guide upwardly extending from upper face 150 and partially surrounding spring guide slot 160b in this example. Spring guide 162b is also shown having three downward sloping shoulders 170b, 172b, and 174b formed on each of its three sides. Shoulder 170b is shown having tab 178b extending therefrom.

Figure 3B:
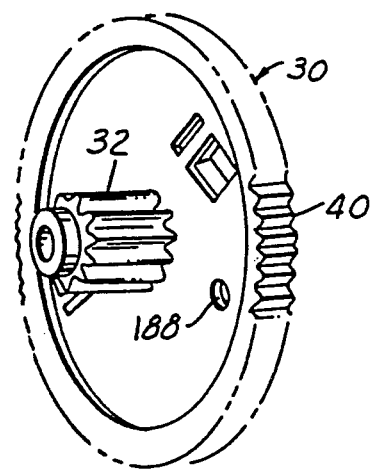
FIG. 3B is a bottom perspective view of a portion of the transfer/backlash gear shown in FIG. 3A.

Continuing with FIG. 3A, and the bottom view shown in FIG. 3B, sprocket gear 30 is shown having circumferential teeth 40 and pinion shaft 32. Sprocket gear 30 includes upper face 180 recessed therein which includes hub 182, and pin 186 extending therefrom for alignment with respective axial opening 152 and guide slot 156 of upper sprocket gear 28. Upper face 180 of sprocket gear 30 also includes assembly alignment opening 188 for alignment with assembly alignment opening 158 of sprocket gear 28 as described in greater detail later herein. Flexible member 192a is shown extending from sectional member 196a on upper face 180 of sprocket gear 30. Tab 198a is here shown extending from the backside of flexible member 192a for reasons described later herein (also see FIG. 3D). Similarly, flexible member 192b is shown extending from sectional member 196b on upper face 180 and tab 198b is shown extending from the backside of flexible member 192b (also see FIG. 3D).

Reference is now made to FIGS. 3C and 3D which show respective top and cross-sectional views of transfer/backlash gear 22 after upper sprocket gear 28 and lower sprocket gear 30 are coupled together. The actual assembly steps required for coupling sprocket gears 28 and 30 together is described later herein with particular reference to FIGS. 3E-3G.

Figure 4:
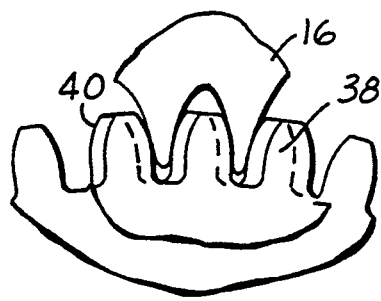
FIG. 4 is a partially broken away view of the transfer/backlash gear mating with a pinion shaft such that minimal slack exist between the transfer/backlash gear and pinion shaft.

Referring first to FIG. 3C coil spring 202a and coil spring 202b are shown inserted within respective spring guides 162a and 162b. The tension force from coil springs 202a and 202b deflect upper sprocket gear 28 from lower sprocket gear 30 and, accordingly, deflect gear teeth 38 from gear teeth 40 for reducing or eliminating slack between the coupling of transfer/backlash gear 22 from pinion gear 16 (see FIG. 4).

Referring now to FIG. 3D, flexible member 192b is shown including portion 202b upwardly extending from sectional member 196b on sprocket gear 30 and having tab 198b extending from its backside. Flexible member 192b is also shown including horizontal flexible member 204b extending from portion 202b and having downwardly extending lip 206b. Flexible member 192b applies a compression force to outer face 150 of sprocket gear 28 for coupling sprocket gears 28 and 30 together.

Continuing with FIG. 3D, spring guide 162b positions coil spring 202b between tabs 178b and 198b. Sloping shoulders 170b, 172b, and 174b of spring guide 162b facilitate easy insertion of spring 202b by an assembler. Spring guide 162a, tab 178a, and tab 198a (located at the back of flexible member 192a) create moveable spring receptacle 212a for easy insertion of spring 202a by an assembler. Similarly, moveable spring receptacle 212b includes spring guide 162b, tab 178b, and tab 198b.

Spring guide 162b and circumferential gear teeth 38 are integrally formed from upper sprocket gear 28. Likewise, flexible member 192b, circumferential teeth 40, and pinion gear 32 are integrally formed from lower sprocket gear 30. Thus, transfer/backlash gear 22 is designed in an exceptionally easy to manufacture form which includes only two integrally formed main components (sprocket gears 28 and 30) having both integrally formed flexible coupling members (flexible members 192a and 192b) and integrally formed spring guides (spring guides 162a and 162b).

Figure 3G:
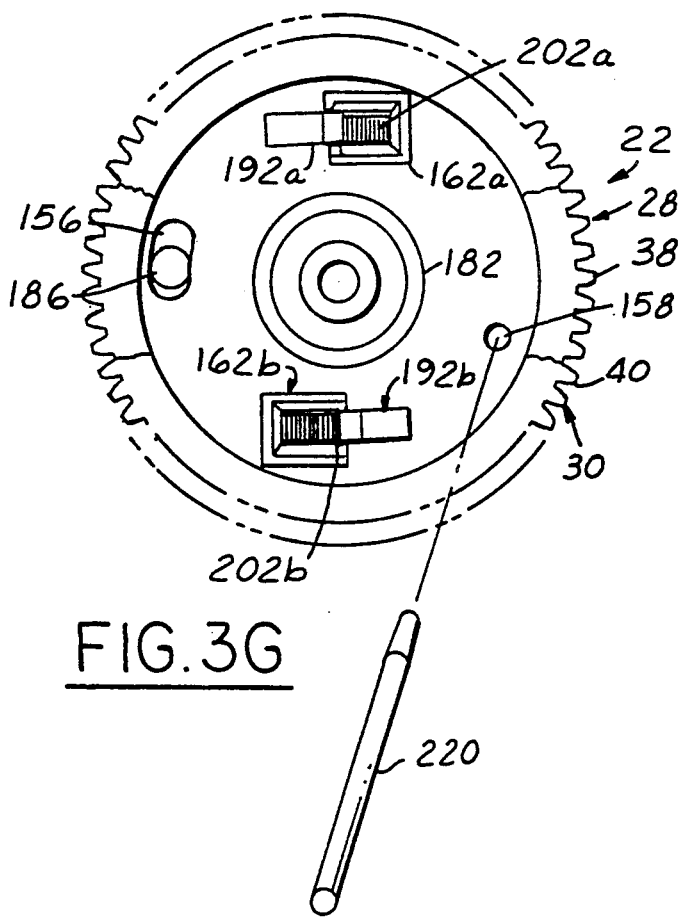

Referring now to FIGS. 3E-3G, the assembly operation of transfer/backlash gear 22 is described and the assembly advantages will become further apparent. Referring first to FIG. 3E, sprocket gear 28 is first placed over sprocket gear 30 such that: flexible member 192a and 192b are inserted through respective spring guide slots 160a and 160b; hub 182 is inserted through hub opening 152; and pin 186 is inserted through guide slot 156.

Sprocket gear 28 is then rotated clockwise until pin 186 rests against the left most end of guide slot 156 as shown in FIG. 3F. In this position, flexible arms 204a and 204b slide over, and exert a compression force against, upper face 150 of sprocket gear 28 as shown in FIG. 3F. Spring guides 162a and 162b are now at a maximum extension for accepting respective coil between tabs 178a and 198a is at a maximum for accepting coil spring 202a. Similarly, the spacing between tabs 178b and 198b is at a maximum position for accepting coil spring 202b. In general, movable spring receptacles 212a and 212b are arranged for easy operator insertion of respective coil springs 202a and 202b by the assembly process described above.

Referring now to FIG. 3G, tool 220 is shown inserted through alignment opening 188 of lower sprocket gear 30 and alignment opening 158 of upper sprocket gear 28. This alignment process also aligns circumferential teeth 38 of upper sprocket gear 28 with circumferential teeth 40 of lower sprocket gear 30. With these circumferential teeth aligned, the assembler then inserts shaft 34 into bushings 36a and 36b (FIG. 1) thereby coupling circumferential teeth 38 and 40 to pinion shaft 16 (FIG. 1) with minimal manipulation. Tool 220 is then removed from alignment openings 158 and 188 such that circumferential teeth 38 and 40 become displaced from one another (FIG. 1, FIG. 3C-D and FIG. 4) substantially eliminating slack between the teeth of transfer/backlash gear 22 and pinion shaft 16. This substantial elimination of slack is apparent by viewing a section of the coupling between transfer/backlash gear 22 and pinion shaft 16 shown in FIG. 4.

This concludes the description of the preferred embodiment. The reading of it by those skilled in the art will bring to mind many alterations and modifications without departing from the spirit and scope of the invention. Accordingly, it is intended that the scope of the invention be limited only by the following claims.

What is claimed:

1. A vehicular speed control system coupled to an engine throttle by transfer gearing having reduced audible gear chatter, comprising:
   phasing means for providing a sequence of electrical phase steps in response to a comparison of actual vehicle speed to a desired vehicle speed;
   a stepper motor coupled to a pinion shaft for rotating said pinion shaft by discrete phase steps in response to said phasing means;
   first gear transfer means having a plurality of gear teeth for rotatably coupling to said pinion shaft with minimal slack between said gear teeth of said first gear transfer means and gear teeth of said pinion shaft; and
   transfer means coupled between said first gear transfer means and the throttle for displacing the throttle in response to rotational movement of said stepper motor.

2. The system recited in claim 1 wherein said stepper motor comprises a three-phase motor.

3. The system recited in claim 1 further comprising an electromagnetic clutch positioned between said transfer means and the throttle for disengaging and engaging said stepper motor from the throttle.

4. A vehicular speed control system coupled to an engine throttle by transfer gearing having reduced audible gear chatter, comprising:

generating means for generating a speed error signal by comparing actual vehicle speed to a set speed;

position generating means for generating a desired phase position signal in response to said speed error signal;

phasing means for providing a sequence of electrical phase steps in response to said desired phase position signal;

a stepper motor coupled to a pinion shaft for rotating said pinion shaft by discrete phase steps in response to said sequence of phase steps;

first gear transfer means having a plurality of gear teeth for rotatably coupling to said pinion shaft with minimal slack between said gear teeth of said first gear transfer means and gear teeth of said pinion shaft, said gear transfer means comprising a first sprocket gear coupled to a second sprocket gear and spring means for displacing said first sprocket gear relative to said second sprocket gear; and second gear transfer means coupled between said first gear transfer means and the throttle for displacing the throttle in response to rotational movement of said stepper motor.

5. The system recited in claim 4 wherein said phasing means generates said sequence of phase steps in response to a comparison of said desired phase position signal to an indication of actual phase position of said stepper motor.

6. The system recited in claim 5 wherein said indication of actual phase position is provided by counting means for counting said sequence of phase pulses.

7. The system recited in claim 4 wherein said position generating means further comprises means for integrating said error signal.

8. A vehicular speed control system coupled to an engine throttle by transfer gearing having reduced audible gear chatter, comprising:

generating means for generating a speed error signal by comparing actual vehicle speed to a set speed;

sequencing means for providing a sequence of electrical phase steps in response to said speed error generating means;

a stepper motor coupled to a pinion shaft for rotating said pinion shaft by discrete phase steps in response to said sequence of phase pulses;

first gear transfer means having a plurality of gear teeth for rotatably coupling to said pinion shaft with minimal slack between said gear teeth of said first gear transfer means and gear teeth of said pinion shaft, said first gear transfer means comprising a first sprocket gear coupled to a second sprocket gear by interlocking means integrally formed on said first sprocket gear and spring means coupled to said interlocking means for displacing said first sprocket gear relative to said second sprocket gear; and second gear transfer means coupled between said first gear transfer means and the throttle for displacing the throttle in response to rotational movement of said stepper motor.

9. The system recited in claim 8 wherein said stepper motor comprises a three-phase motor.

10. The system recited in claim 8 further comprising an electromagnetic clutch positioned between said second gear transfer means and the throttle for disengaging and engaging said stepper motor from the throttle.

11. A vehicular speed control system coupled to an engine throttle by transfer gearing having reduced audible gear chatter, comprising:

generating means for generating a speed error signal by comparing actual vehicle speed to a set speed;

position generating means for generating a desired phase position signal in response to said speed error signal;

phasing means for providing a sequence of electrical phase steps in response to said desired phase position signal;

a stepper motor coupled to a pinion shaft for rotating said pinion shaft by discrete phase steps in response to said sequence of phase pulses;

first gear transfer means having a plurality of gear teeth for rotatably coupling to said pinion shaft with minimal slack between said gear teeth of said first gear transfer means and gear teeth of said pinion shaft, said first gear transfer means comprising a first sprocket gear coupled to a second sprocket gear in compression by a flexible member integrally formed on said first sprocket gear and extending through an opening in said second sprocket gear to apply compression to an outer face of said second sprocket gear, guide means integrally formed on said outer face of said second sprocket gear for alignment with said flexible member, and spring means inserted between said flexible member and said guide means on said outer face of said second sprocket gear for displacing said first sprocket gear relative to said second sprocket gear; and second gear transfer means coupled between said first gear transfer means and the throttle for displacing the throttle in response to rotational movement of said stepper motor.

12. The system recited in claim 11 wherein said phasing means generates said sequence of phase steps in response to a comparison of said desired phase position signal to an indication of actual phase position of said stepper motor.

13. The system recited in claim 12 wherein said indication of actual phase position is provided by counting means for counting said sequence of phase pulses.

14. The system recited in claim 11 wherein said position generating means further comprises means for integrating said error signal.

15. An anti-backlash gear having reduced audible gear chatter when coupled to a stepper motor via a pinion shaft, comprising:

a first sprocket gear having circumferential teeth for mating with the pinion shaft and also having an outer face with an integrally formed flexible member extending therefrom;

a second sprocket gear having circumferential teeth for mating with the pinion shaft and also having an integrally formed spring guide;

a spring configured for insertion into said spring guide; and alignment means for aligning said first sprocket gear to said second sprocket gear such that said flexible member exerts a tension force against said outer face of said first sprocket gear and said spring in cooperation with said alignment means displaces said circumferential teeth of said first sprocket gear from said circumferential teeth of said second sprocket gear thereby eliminating gear slack when coupled with the pinion shaft.

* * * * *